United States Patent

[11] 3,634,841

[72] Inventor John Anderson Irvine
  Midlothian, Scotland
[21] Appl. No. 864,734
[22] Filed Oct. 8, 1969
[45] Patented Jan. 11, 1972
[73] Assignee Findlay, Irvine Limited
  Midlothian, Scotland
[32] Priority Oct. 10, 1968
[33] Great Britain
[31] 48,148/68

[54] TEMPERATURE AND SALINITY INDICATING AND/OR CONTROL APPARATUS
  10 Claims, 1 Drawing Fig.
[52] U.S. Cl. .................................................. 340/234,
  340/235
[51] Int. Cl. ............................................ G08b 21/00
[50] Field of Search .......................... 340/235,
  234

[56] References Cited
  UNITED STATES PATENTS
3,197,699 7/1965 Johansen ..................... 340/235
3,469,250 9/1969 Voight .......................... 340/235

Primary Examiner—Harold I. Pitts
Attorney—Kemon, Palmer & Estabrook

ABSTRACT: Apparatus for use in indicating and/or controlling the temperature of a road or like surface in the presence of ice includes a temperature-sensitive transistor mounted on or in the surface and arranged in the presence of a first bias voltage to generate a predetermined output signal when the temperature of the device falls to near 0° C. A conductivity detector is arranged to detect the presence of moisture of an electrical conductivity exceeding a predetermined conductivity and to trigger a bistable to apply a second bias voltage to the transistor. In the presence of the second bias voltage the transistor generates the predetermined output signal only when the temperature of the transistor falls to a predetermined temperature below 0° C. Thus if the surface has been covered with salt the indication or heating is inhibited until the temperature has fallen to the predetermined temperature below 0° C.

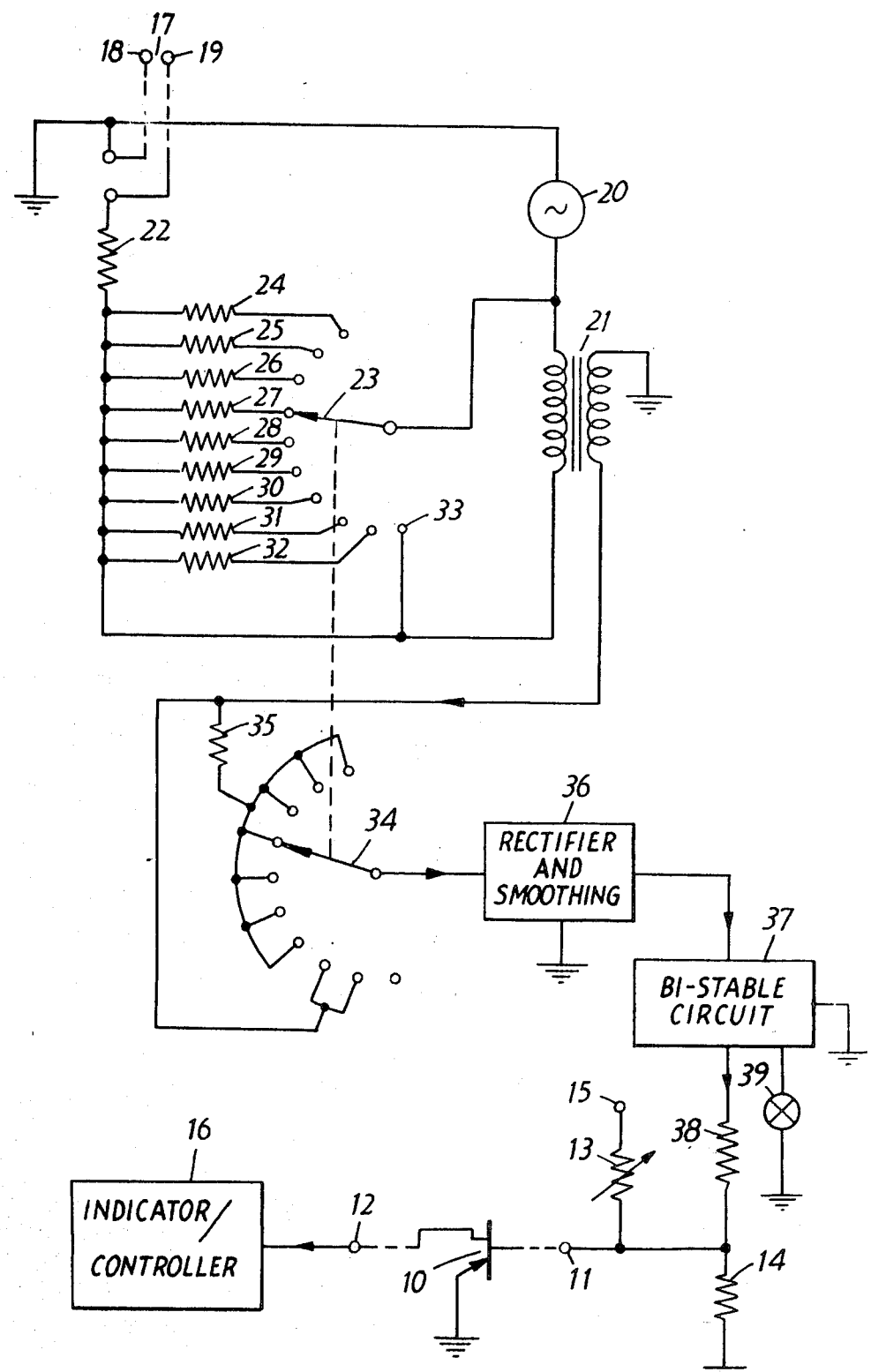

TEMPERATURE AND SALINITY INDICATING AND/OR CONTROL APPARATUS

This invention relates to apparatus for use in indicating when the temperature of the surface of a road or the like (for example an airfield runway) falls to a predetermined value in the vicinity of the freezing temperature of water and/or for heating the said surface when the temperature thereof approaches the freezing point of water.

Apparatus for providing such facilities in described in U.S. Pat. No. 3,237,156 and in the specification of my copending application, Ser. No. 626,105 filed March 27, 1967, now U.S. Pat. No. 3,524,043.

It is common practice to spread salt upon a road surface to melt ice and snow when the temperature of the road surface is at 0° C. or not much less than 0° C. thus lowering the temperature at which freezing takes place. If the road surface is artificially heated as soon as the temperature approaches 0° C. wasteful application of heat will take place in the event that the road has been salted.

An object of this invention is to provide means for indicating and/or controlling the temperature of a road or like surface which is responsive to the presence of salt on the surface to prevent false indications or wasteful application of heat.

The invention makes use of the fact that the freezing temperature of a solution of salt in water varies with the concentration of salt in the solution, and a concentration of only 5 percent depresses the freezing point by about 7° F. (3.9° C.)

The invention comprises a temperature-sensitive semiconductor device which in use is positioned in a road or like surface and is connected to provide an output signal at an output when the temperature of the semiconductor device falls below a first value determined by a bias voltage. A detector for detecting the presence of moisture of an electrical conductivity exceeding a predetermined conductivity is connected to alter the bias voltage whereby the apparatus provides an output signal when the temperature of the semiconductor device falls below a second value lower than the first value.

Thus as the solution of salt in water even in weak concentrations not only depresses its freezing point but also markedly increases its electrical conductivity, the invention can be used to inhibit the generation of an output signal and hence the indication or heating until the temperature at the surface has fallen to, say, −3.5° C. It will be appreciated that the said output signal may, in practice, consist of the absence of a normally present signal.

The invention will now be described, by way of example, with reference to the accompanying drawing which is a circuit diagram of one embodiment of the invention.

In the drawing a temperature-sensitive transistor 10 connected between two terminals 11 and 12 is embedded in the surface of a road (not shown). The transistor 10 is connected between, on the one hand, a biasing circuit comprising a variable resistor 13 and a fixed resistor 14 connected between a voltage supply terminal 15 and earth, and on the other hand an indicator and/or heating controller 16. The transistor 10 acts as a temperature-sensing probe and its operation in conjunction with 16 may be as described in the specification of my aforementioned application, Ser. No. 626,105. Briefly, the indicator and/or controller 16 is normally switched off. When the temperature of the road surface falls to a value near 0° C. the current through the sensing probe 10 reaches a value at which the indicator and/or heating controller 16 is switched on. The temperature at which this occurs can be chosen by adjustment of the resistor 13.

The circuit as so far described is known.

In applying the present invention to this known circuit an additional probe 17 is provided in the road surface. The probe consists of two electrodes shown schematically at 18 and 19 spaced from one another and having faces flush with the road surface. The electrodes 18 and 19 are preferably embedded in a tough synthetic resin, such as that sold under the trade mark Araldite, of which the surface is also flush with the road surface. Thus when water is present it forms a bridge between the two electrodes.

The conductivity of the bridge with salt dissolved in the water increases substantially and hence the probe 17 can be used to detect the presence of salt by detection of the change in conductivity.

For this purpose a source 20 of AC is connected on one side direct to the electrode 18 and on the other side is connected through the primary winding of a transformer 21 and a resistor 22 in series to the other electrode 19. By means of a selector switch resistors 24 to 32 of different values can be connected across the primary winding of the transformer 21 in order to adjust the sensitivity of the apparatus. A short circuit of the primary winding of the transformer 21 can also be effected by selection of the contact 33 to switch off the probe circuit.

The secondary winding of the transformer 21 is connected, by means of a selector switch 34 ganged with the switch 23, either directly or through a resistor 35 to a rectifier and smoothing circuit 36. Thus the output of the circuit 36 consists of direct voltage of a magnitude dependent upon the conductivity of the bridge between the electrodes of the probe 17 and the setting of the ganged switches 23 and 34.

In dry conditions the output is substantially zero. When rainwater bridges the electrodes the output increases and when salt is dissolved in the water the output increases substantially.

A bistable circuit 37 is connected to the output of the circuit 36 and is normally in its off or "0" condition. The switches 23 and 34 are adjusted to a setting such that ordinary rainwater does not provide a sufficient output from the circuit 36 to trigger the circuit 37 into its on or "1" state whereas a salt solution of a concentration of about 0.001 gm.mol/1,000 cc. on the probe 17 results in sufficient output from 36 to trigger the bistable circuit 37 into its on or "1" state.

The bistable circuit is connected through a resistor 38 to the junction of the resistor 14 with the resistor 13 and it is arranged that when the bistable circuit 37 is in its "0" state no current flows through the resistor 38 into the resistor 14. When the bistable circuit 37 is in its "1" state current flows through the resistor 38 into the resistor 14 and hence the current through the temperature-sensing probe 10 is also increased. Thus the temperature of the probe 10 has to fall further in order to switch on the indicator and/or control circuit 16. This increase is made such that the temperature of the probe 10 has to fall to about −3.6° C. before the circuit 16 is switched on.

If desired an indicator lamp 39 can also be connected to the bistable circuit 37 for indicating that the circuit 37 is in its "1" state.

I claim:

1. A surface-ice-sensing system comprising:
   a surface;
   a temperature-sensitive semiconductor device in said surface having a control terminal and an output terminal, the output signal developed at said output terminal being dependent upon the signal applied to said control terminal and upon the temperature of said device;
   first biasing means coupled to said control terminal of said device to apply a first biasing signal to said control terminal of said device, said first biasing signal being of a magnitude such that said output signal developed at said output terminal of said device reaches a preset level when said device is at around 0° C.;
   a conductivity detector in said surface to measure the conductivity of moisture on said surface;
   second biasing means coupled between said conductivity detector and said semiconductor device to apply a second biasing signal to said control terminal of said device when said conductivity detector detects a conductivity in excess of a predetermined conductivity, said second biasing signal being of a magnitude such that said output signal developed at said output terminal of said device reaches said preset level only when said device is at a predetermined temperature below 0° C. whereby in the presence of moisture on said surface having a conductivity exceeding said predetermined conductivity, generation of said output signal is inhibited until said device reaches said predetermined temperature below 0° C.

2. Apparatus as claimed in claim 1, wherein said detector is adjustable to vary said predetermined conductivity.

3. Apparatus as claimed in claim 1, wherein said second biasing means comprises a bistable circuit operative as a switch.

4. Apparatus as claimed in claim 3, wherein said first biasing means comprise a voltage divider connecting a source of biasing voltage to said control terminal of said device, and said bistable circuit is connected to vary said voltage divider.

5. Apparatus as claimed in claim 1, wherein said detector comprises two spaced electrodes.

6. Apparatus as claimed in claim 5, wherein said detector further comprises a source of alternating current, and the primary winding of a transformer connected in series with said electrodes across said source.

7. Apparatus as claimed in claim 6, comprising a rectifier connected to a secondary winding of said transformer.

8. Apparatus as claimed in claim 1 comprising an indicator connected to said output terminal of said device.

9. Apparatus as claimed in claim 1 comprising a heater connected to said output terminal of said device.

10. Apparatus as claimed in claim 1 wherein said device comprises a transistor, said first biasing means comprises a variable potential divider the tap of which is connected to the control electrode of said transistor, said detector comprises two spaced electrodes, a source of alternating current in series with said electrodes, a primary winding of a transformer connected across said electrodes and said source, variable resistance means connected across said primary winding, and rectifying and smoothing means connected to a secondary winding of said transformer, and said second biasing means comprises a bistable circuit operative as a switch and connected to said potential divider to vary the effective resistance of one part thereof.

* * * * *